July 17, 1934.    J. A. DYER    1,966,977
TRAILER COUPLING AND BRAKE MECHANISM
Original Filed May 6, 1932    3 Sheets-Sheet 1
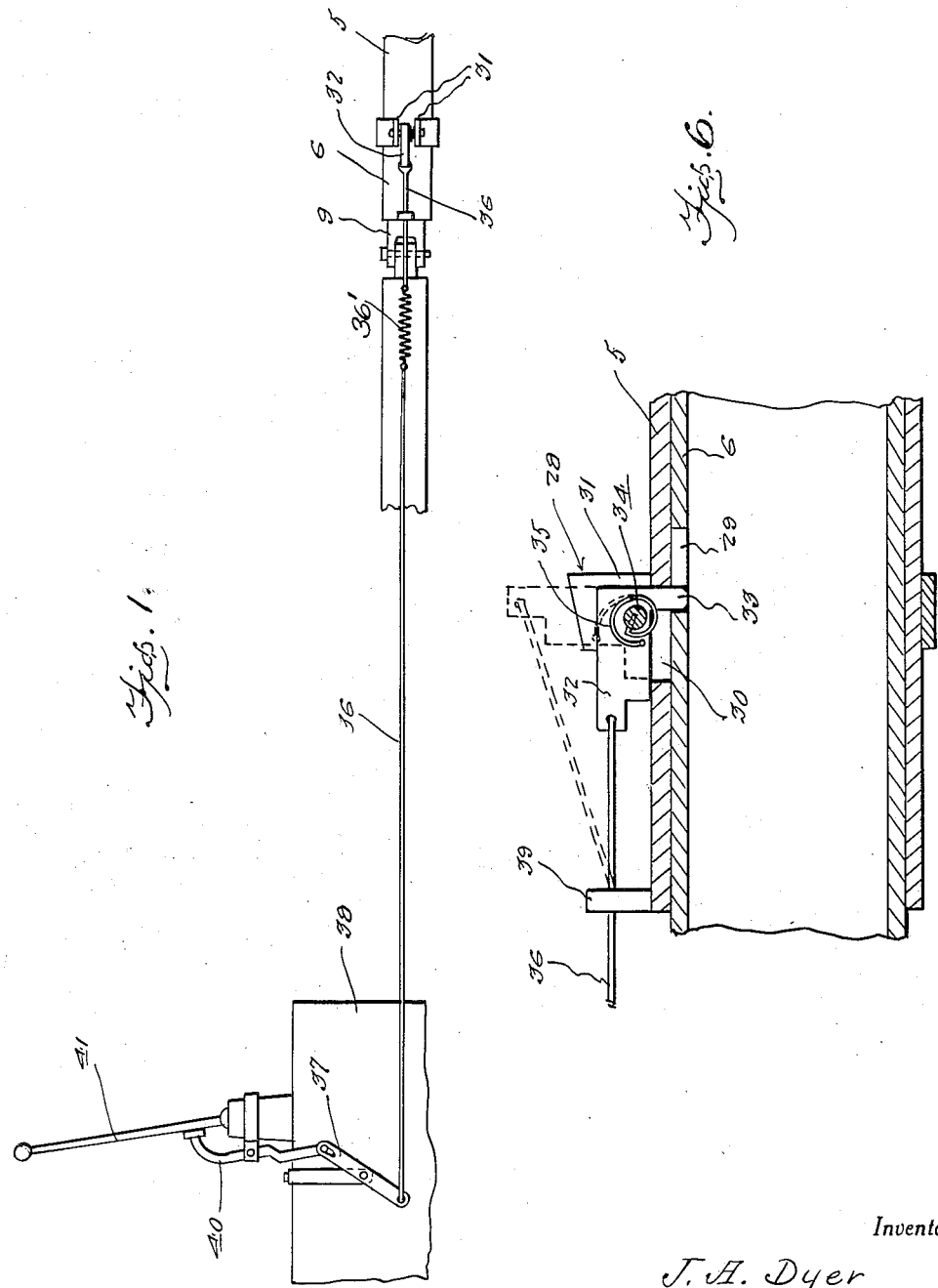
Inventor
J. A. Dyer
By Clarence A. O'Brien
Attorney

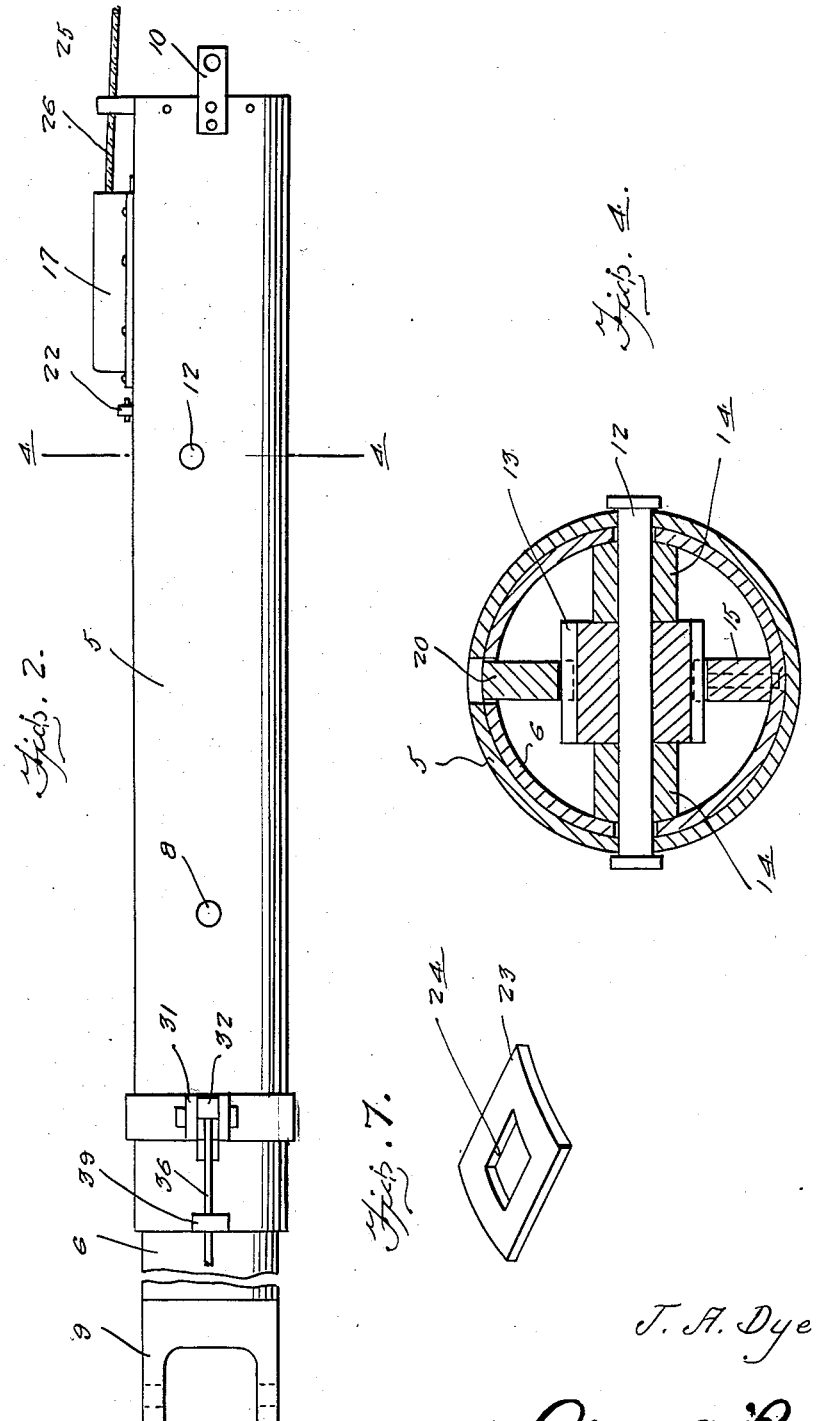
July 17, 1934.  J. A. DYER  1,966,977
TRAILER COUPLING AND BRAKE MECHANISM
Original Filed May 6, 1932    3 Sheets-Sheet 2
Inventor
J. A. Dyer
By Clarence A. O'Brien
Attorney July 17, 1934.  J. A. DYER  1,966,977
TRAILER COUPLING AND BRAKE MECHANISM
Original Filed May 6, 1932   3 Sheets-Sheet 3
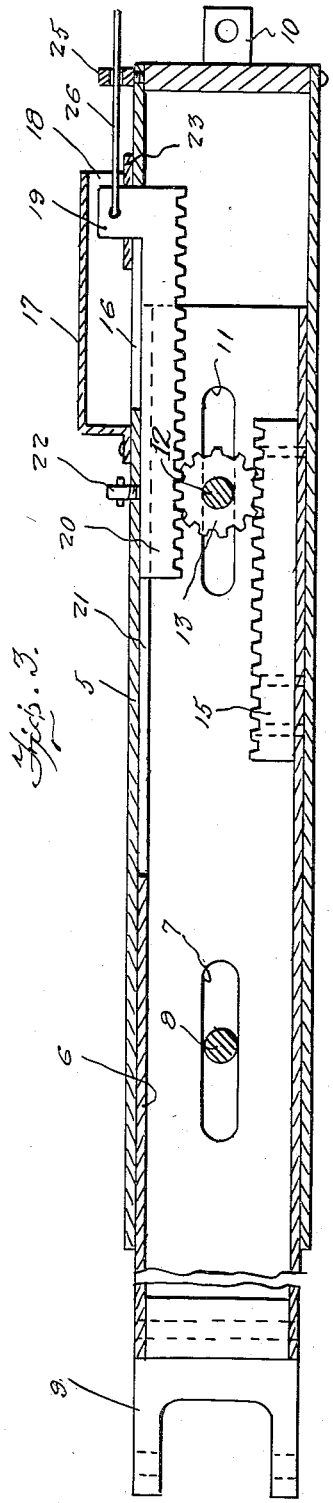
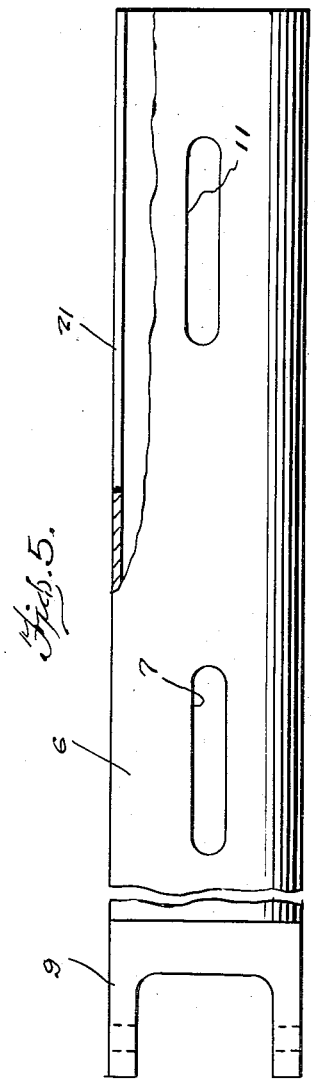
Inventor
J. A. Dyer
By Clarence A. O'Brien
Attorney Patented July 17, 1934

1,966,977

UNITED STATES PATENT OFFICE 1,966,977

TRAILER COUPLING AND BRAKE MECHANISM

James A. Dyer, Anadarko, Okla.

Application May 6, 1932, Serial No. 609,708
Renewed March 12, 1934

2 Claims. (Cl. 192—4)

This invention appertains to new and useful improvements in trailer couplings and more particularly to a novel device in the nature of a tongue for trailers wherein means is associated therewith whereby the tractor or other leading vehicle can actuate the brakes of the trailers by way of this device.

The principal object of this invention is to provide a coupling for interposition between a leading vehicle and a trailer which can be operated by the leading vehicle to impart action to the brakes of the trailer vehicle.

Another important object of the invention is to provide a coupling device of the character stated which in operation will be positive-acting and not susceptible to the development of ready defects.

These and other important objects and advantages of the invention will become apparent to the reader of the following specification.

In the drawings:—

Figure 1 represents a diagrammatic view showing the means associated with the coupling device for locking the same when the gear shift lever is in reversed position.

Fig. 2 represents a fragmentary side elevational view of the coupling device.

Fig. 3 represents a longitudinal sectional view through the device as shown in Fig. 2.

Fig. 4 represents a cross sectional view taken substantially on line 4—4 of Fig. 2.

Fig. 5 represents a side elevational view of the inner barrel.

Fig. 6 represents a fragmentary longitudinal sectional view through the coupling at the locking mechanism thereof.

Fig. 7 represents a perspective view of the slot cover for the outer barrel.

Referring to the drawings wherein like numerals designate like parts, it can be seen in Figs. 2 and 3, that the novel coupling consists of an outer barrel 5 and an inner barrel 6, these barrels being in telescopic relation and limited in their movement with respect to each other by the slots 7 of the inner barrel 6 which receive the end portions of the transverse pin 8 extending through the outer barrel 5.

The front end of the inner barrel 6 is provided with a yoke 9 whereby the inner barrel can be attached to the leading vehicle such as a tractor or the like while the rear end of the outer barrel 5 is provided with rearwardly extending ears 10 whereby the rear end of the outer barrel 5 can be attached to the trailer.

Adjacent the rear end of the barrel 6 are the registering diametrically opposed slots 11 thru which extends the shaft 12, the latter being provided with a gear 13, and this gear is spaced from the inner side of the barrel 6 by spacers 14.

Secured to the inner side of the barrel 6 adjacent the rear end thereof is the rack 15 with which the gear 13 meshes, while secured to the top side of the barrel 5 over the slot 16 therein is the hood 17 open at its rear end as at 18. Slidable through this slot 16 longitudinally of the barrel 5 is the lug 19 on the rear end of the slidable rack 20, this rack being slidable in the slot 21 of the inner barrel 6 and lubricated by a suitable fitting 22.

As is clearly shown in Fig. 7, numeral 23 represents a plate having an opening 24 therein so that the plate can fit snugly around the lug 19. This plate 23 is curved transversely so as to snugly fit against the top portion of the barrel 5 and this plate acts as a closure over the rear portion of the slot 16, so that rain or other matter cannot readily get into the inside of the coupling.

Numeral 25 represents an eye on the rear end of the barrel 5 through which the cable 26 extends this cable 26 extending through the brake mechanism (not shown in the drawings) of the trailer.

It can now be seen, that when a leading vehicle and trailer are travelling down a hill and it is desired that the brakes of the trailer be applied, it can be observed that the force of the trailer riding against the barrel 5, will ride the barrel 5 onto the barrel 6 a substantial distance so that the stationary rack 15, that is the rack carried by the barrel 6, will rotate the gear 13 and this gear 13 in turn will shift the rack 20 forwardly. This will obviously impart a pulling motion on the cable 26 which will apply the brake of the trailer in accordance with the pressure of its force against the coupling.

This same action will take place when the leading vehicle is backed toward the trailer and in order to avoid this, so that free motion of the trailer and leading vehicle can be attained, a locking mechanism such as is denoted generally by numeral 28 in Fig. 6 is employed, whereby the barrels can be locked against coaction, so that the barrels will operate in unison as though a rigid unit.

In providing this locking means, an aperture 29 is provided in the barrel 6 and a similar aperture 30 is provided in the outer barrel 5, while extending upwardly from the barrel 5 adjacent the aperture 30 are the ears 31. Swingably mounted between the ears 31 is the plate 32 provided with a laterally disposed finger 33, the plate 32 being swingable on the shaft 34 and as is clearly shown in Fig. 6 a spiral spring 35 normally serves to maintain the plate 32 in the dotted line position shown in Fig. 6.

Extending from the plate 32 is the cable 36 which extends to the rocker 37 on one side of the transmission casing 38 of the lead vehicle. The cable 36 has a spring section 36' therein to afford retarded operation of the plate 32, this affording the equivalent of a slack without having this latter condition in the cable. This cable 36 extends through the guide 39 and connects to the lower end of this rocker 37, while the upper end of the rocker 37 is attached to the lower end of the swingable pedal 40. This pedal 40 is in the path of the gear shift lever 41 only when the gear shift lever is in motion toward its reverse position.

It can now be seen, that when the lever 41 is shifted to set the gears in reverse, the same will engage the pedal 40 and move the same, resulting in a pull on the cable 36 and the tripping of the plate 32 to the position shown in Fig. 6, wherein the fingers 33 will engage through both of the openings 29 and 30 for securing the barrels 5 and 6 together.

To get the openings in the barrels 5—6 in proper relation to receive the finger 36, it may be necessary to drive the tractor slightly forward, while the trailer is held back, especially when this connection is to be made on a hill.

Thus the barrels 5 and 6 operate in unison when the tractor or other lead vehicle moves backwardly toward the trailer.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. In combination, a gear shift lever, a pedal in the path of the gear shift lever when in motion toward reverse position, a coupling including a pair of slidable sections, a lock on the sections whereby the sections can be secured together against sliding motion, and a connection between the lock and the said pedal.

2. In combination, a lead vehicle having a gear shift lever, a pedal in the path of the gear shift lever when in motion toward reverse position, a trailer having brakes, a coupling between the lead vehicle and the trailer including a pair of slidable sections, a lock on the sections whereby the sections can be secured together against sliding motion, a connection between the lock and the said pedal, and means between the said barrels whereby the said brakes of the trailer can be operated.

JAMES A. DYER.